(12) United States Patent
Yeganeh et al.

(10) Patent No.: US 10,745,627 B2
(45) Date of Patent: *Aug. 18, 2020

(54) DESALTER OPERATION

(71) Applicant: ExxonMobil Research and Engineering Company, Annandale, NJ (US)

(72) Inventors: Mohsen Shahmirzadi Yeganeh, Hillsborough, NJ (US); Robert P. Lucchesi, Flemington, NJ (US); Jessica Lynn Hegner, Phillipsburg, NJ (US); Richard W. Flynn, Elizabeth, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/734,328

(22) Filed: Jun. 9, 2015

(65) Prior Publication Data

US 2015/0267127 A1 Sep. 24, 2015

Related U.S. Application Data

(63) Continuation-in-part of application No. 14/556,398, filed on Dec. 1, 2014.

(60) Provisional application No. 61/918,843, filed on Dec. 20, 2013.

(51) Int. Cl.
| | | |
|---|---|---|
| *C10G 33/02* | (2006.01) | |
| *C10G 31/08* | (2006.01) | |
| *C10G 32/02* | (2006.01) | |
| *C10G 33/04* | (2006.01) | |
| *B01D 17/04* | (2006.01) | |
| *B01D 17/06* | (2006.01) | |
| *C10G 19/02* | (2006.01) | |
| *C02F 1/463* | (2006.01) | |

(52) U.S. Cl.
CPC ........... *C10G 33/02* (2013.01); *B01D 17/047* (2013.01); *B01D 17/06* (2013.01); *C10G 19/02* (2013.01); *C10G 31/08* (2013.01); *C10G 32/02* (2013.01); *C10G 33/04* (2013.01); *C02F 1/463* (2013.01)

(58) Field of Classification Search
CPC ........ C10G 33/02; C10G 33/04; B01D 17/06; B01D 17/04
See application file for complete search history.

(56) References Cited

U.S. PATENT DOCUMENTS

| | | | | |
|---|---|---|---|---|
| 3,592,756 A * | 7/1971 | Jarvis | ................. | B01D 17/0208 204/662 |
| 4,200,550 A * | 4/1980 | Scherrer | ................. | C10G 31/08 516/141 |
| 4,722,781 A * | 2/1988 | Swartz | ................... | C10G 31/08 208/177 |
| 5,746,908 A * | 5/1998 | Mitchell | ................. | C10G 31/08 208/188 |
| 6,299,780 B1 * | 10/2001 | Freshour | ............ | B01D 17/0214 210/708 |

(Continued)

*Primary Examiner* — Brian W Cohen
(74) *Attorney, Agent, or Firm* — Glenn T. Barrett

(57) ABSTRACT

A petroleum desalting process is improved by introducing the an alkaline compound such as sodium carbonate into the water phase, preferably in the vicinity of the water/oil interface which forms between the oil and water layers. This makes the rapid and effective separation of the oil and water phases from the emulsion layer possible.

9 Claims, 4 Drawing Sheets

(56) References Cited

U.S. PATENT DOCUMENTS

Figure 1:
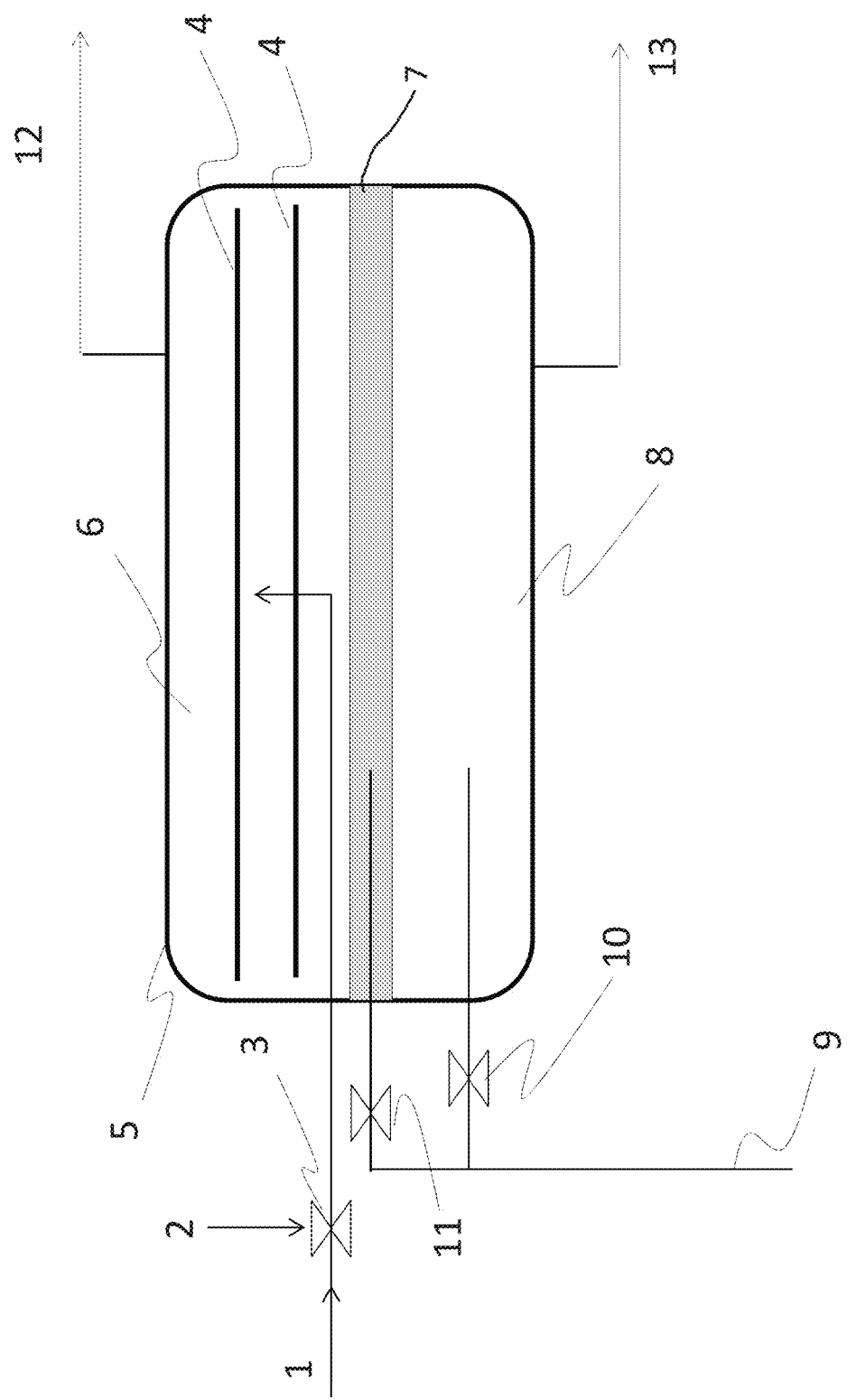

| | | |
|---|---|---|
| 7,867,382 B2 | 1/2011 | Droughton |
| 7,923,418 B2 | 4/2011 | Becker |
| 7,981,979 B2 | 7/2011 | Flatt |
| 2014/0202927 A1* | 7/2014 | Tao .................. B01D 17/047 208/188 |

* cited by examiner

DESALTER OPERATION

CROSS REFERENCE TO RELATED APPLICATIONS

This application is a continuation-in-part of application Ser. No. 14/556,398, filed 1 Dec. 2014 which claimed priority from application Ser. No. 61/918,843, filed 20 Dec. 2013. The present application claims the benefit under 35 USC 120 of application Ser. No. 14/556,398.

FIELD OF THE INVENTION

This invention relates to the operation of petroleum desalters and in particular to an improved method of adding demulsifiers to the desalting process.

BACKGROUND OF THE INVENTION

Crude petroleum normally contains salts that may corrode refinery units; salt is removed from the crude oil by a process known as "desalting", in which hot crude oil is mixed with water and a suitable demulsifying agent to form a water-in-oil emulsion which provides intimate contact between the oil and water, transferring salt into the water. The salty emulsion is then passed into a high voltage electric field inside a closed separator vessel. The electric field forces water droplets to coalesce, forming larger water droplets. As the water droplet volumes increase, they settle to the bottom of the tank under gravitation. The desalted oil forms at the upper layer in the desalter from where it is continuously drawn off for distillation. The salty water is withdrawn from the bottom of the desalter.

During operation of desalter units, a stable emulsion phase (also known as a "rag layer") of variable composition and thickness forms above the interface between the oil- and the separated bulk water phase at the bottom of the desalter. This interface will be referred to here as "oil/bulk-resolved-water interface". The formation of a rag layer is mostly due to stability of the oil/bulk-resolved-water interface caused by natural surfactants (e.g. asphaltene, naphthenic acid) and/or solids. Particularly, solids can reside at the interface generating a physical barrier against the immersion of water droplets into the bulk water phase at the bottom of the desalter. Rag layer formation is especially problematic for crude with high amount of natural surfactants and/or solids. The growth of rag layer reduces workable volume and may short the electric circuit and force unplanned and costly desalter shut down.

Additionally, processing crudes with high rag layer formation tendencies in rent desalter configurations may cause poor desalting (salt removal) efficiency due to solids build up at the bottom of the vessel, and/or a solids-stabilized rag layer leading to erratic level control and insufficient residence time for proper water/oil separation. Formation of the rag layer has become a major desalter operating concern, generating desalter upsets, increased preheat train fouling, and deteriorating quality of the brine effluent and disruption of the operation of the downstream wastewater treatment facilities.

The water content of the rag layer may range from 20 to 95% water with the balance being hydrocarbon (normally full range crude oil) and up to 5 weight percent inorganic solids. Precipitated asphaltenes, waxes, and paraffins may also be found at elevated levels in the rag layer (compared to the incoming crude oil) which combine with particulates (solids), to bind the mixture together to form a complex structure that is highly stable. Intractable emulsions of this kind comprising oil, water and solids make adequate separation and oil recovery difficult. Often, these stable emulsions arising from the desalter are periodically discarded as slop streams. This results in expensive treating or handling procedures or pollution problems as well as the fact that crude oil is also lost with these emulsions and slop streams.

Refinery sites which process high solids-content crudes have the most pervasive problems with emulsion formation, Heavy crude oils and bitumens from Western Canada which contain elevated levels of small clay fines and other small solids are particularly prone to forming large volumes of highly stable emulsion and with such feeds, growth of the rag layer is more prevalent. These feeds are, however, being introduced to refineries in greater quantities despite two main disadvantages related to the efficacy of desalting. First, the viscosity of these crudes can be quite high, so transport of water through the feed is slower than in high API gravity crude. Second, the density mismatch between water and oil is lower, so the gravitational energy gradient is reduced compared to higher API gravity crudes. Growth of the rag layer in the desalter requires either the amount of crude passed through the desalter is reduced or removal of the rag layer from the desalting vessel for external treatment.

Attempts to mitigate the effects of rag layer formation are normally carried out by withdrawal of the emulsion from the unit or by the addition of chemical demulsifiers upstream of a desalter. The use of the demulsifier has proven to be effective in reducing emulsion stability between electrodes in a desalter, but may not be effective in reducing the rag layer build-up which is mainly due to stability of the oil/bulk-resolved-water interface. The common practice for application of demulsifiers has been to add the chemical demulsifiers to the water, oil, or the emulsion before introducing the oil/water mixture to the electric field, as shown by the following references.

U.S. Pat. No. 5,746,908 (Mitchell/Phillips Petroleum), discloses the use of steam to make emulsion and adding demulsifier to the mixture.

U.S. Pat. No. 7,867,382 (Droughton) discloses the use of demulsifier and mesoporous materials for reducing water-in-oil emulsion stability.

U.S. Pat. No. 7,923,418 (Becker/Baker Hughes) discloses the use of acrylate polymer emulsion breakers for reducing stability of a water-in-oil emulsion.

U.S. Pat. No. 7,981,979 (Flatt/Nalco) discloses the use of siloxane cross-linked demulsifiers for reducing water-in-oil emulsion stability.

The above-listed patents disclose the addition of chemical demulsifiers to water, oil, or emulsion before introducing an electric field. This is a common practice in the application of demulsifiers for several decades. A shortcoming of the current practice is due, in part, to the inability of chemical demulsifiers to reach high enough concentrations at the oil/bulk-resolved-water interface, particularly at the beginning of the desalter operation. In our co-pending application Ser. No. 14/556,398, however, we disclosed an improved desalting method in which a demulsifier is injected into the emulsion layer or into the water phase in the region of the emulsion layer to promote separation of the oil and water phases from the emulsion layer. Among the demulsifiers contemplated for use were the polyethyleneimines, polyamines, polyols, ethoxylated alcohol sulfates, long chain alcohol ethoxylates, long chain alkyl sulfate salts, e.g. sodium salts of lauryl sulfates, epoxies, di-epoxies (which may be ethoxylated and/or propoxylated) and the succinated polyamines prepared by the succination of polyamines/polyamine/imines with a long chain alkyl substituted maleic anhydride.

SUMMARY OF THE INVENTION

We have now found that the addition of an alkaline acting compound such as sodium carbonate to the desalter water materially improves the separation of the oil and water phases and promotes dehydration of the emulsion. The method is effective in enhancing dehydration of the oil/water emulsion and in reducing oil/bulk-resolved-water interface stability, as compared to demulsifier injection upstream of the desalter vessel.

In operation, the desalting is carried out by mixing a crude oil to be desalted with water and passing the mixture of oil and water to the desalter vessel. The mixture enters the desalting vessel in the form of an emulsified oil/water mixture which is then separated by application of an electric field between high voltage electrodes. Water droplets in the emulsified mixture coalesce in the electric field and settle towards the bottom of the tank under gravitational forces. The electrocoalesced water droplet must break the skin between oil and bulk-resolved-water before immersing into the water phase at the bottom of a desalter. The oil/bulk-resolved-water interface can be highly stable due to crude natural surfactants and/or solids. A stable oil/bulk-resolved-water interface prevents droplets from becoming immersed in the water phase so causing emulsion or "rag layer" formation: a stabilized emulsion layer formed from the oil and the water and emulsion-stabilizing solids locates itself above the interface between the denser, settled water layer and the supernatant oil layer. According to the present invention, an alkaline compound is used to destabilize and dehydrate the emulsion. The separated water is removed as effluent through a water outlet at the bottom of the vessel and desalted oil is removed from the oil layer through an oil outlet at the top of the vessel.

DRAWINGS

Figure 2:
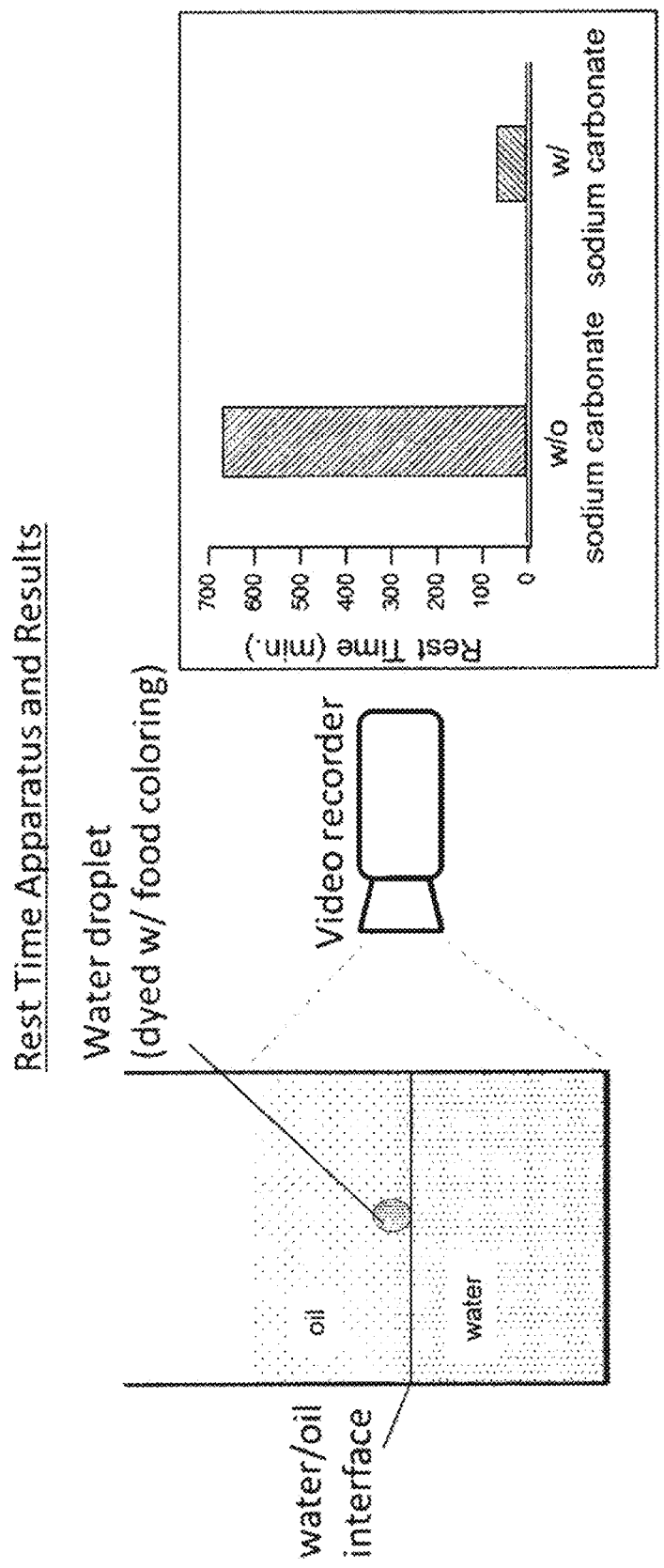
Figure 3:
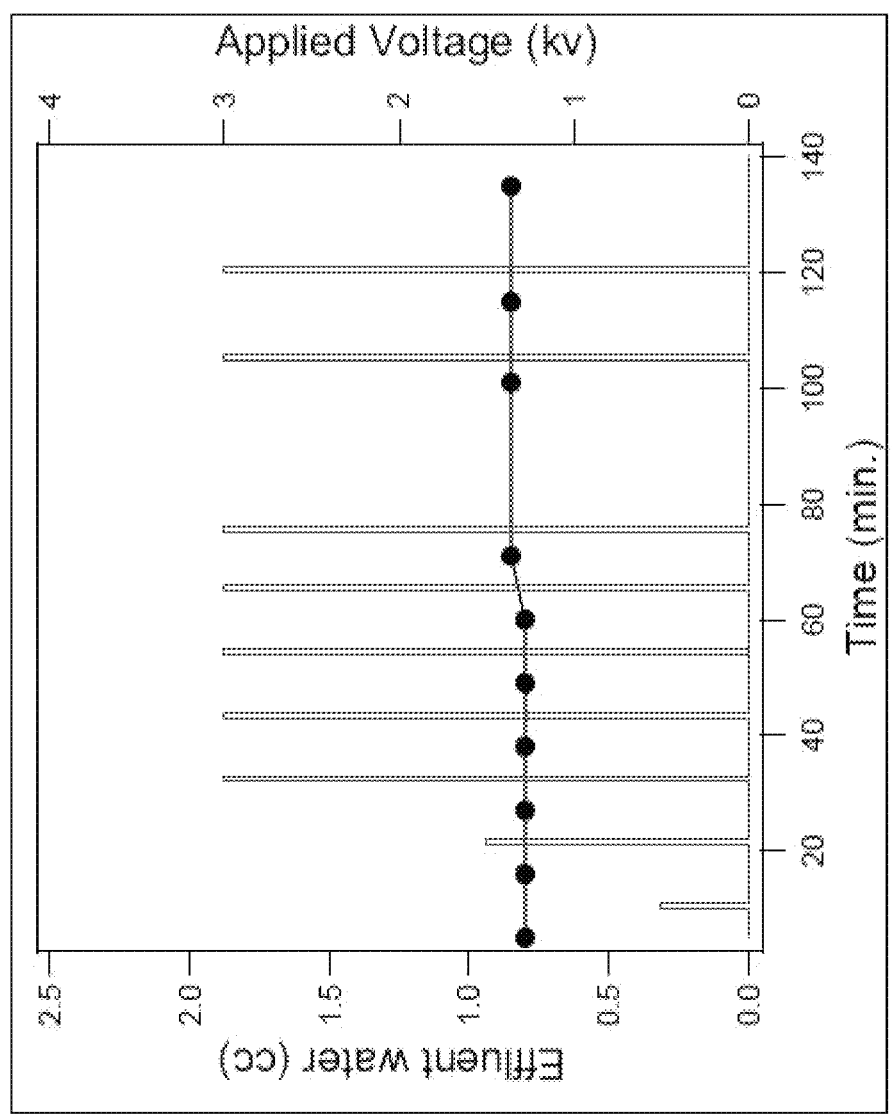
Figure 4:
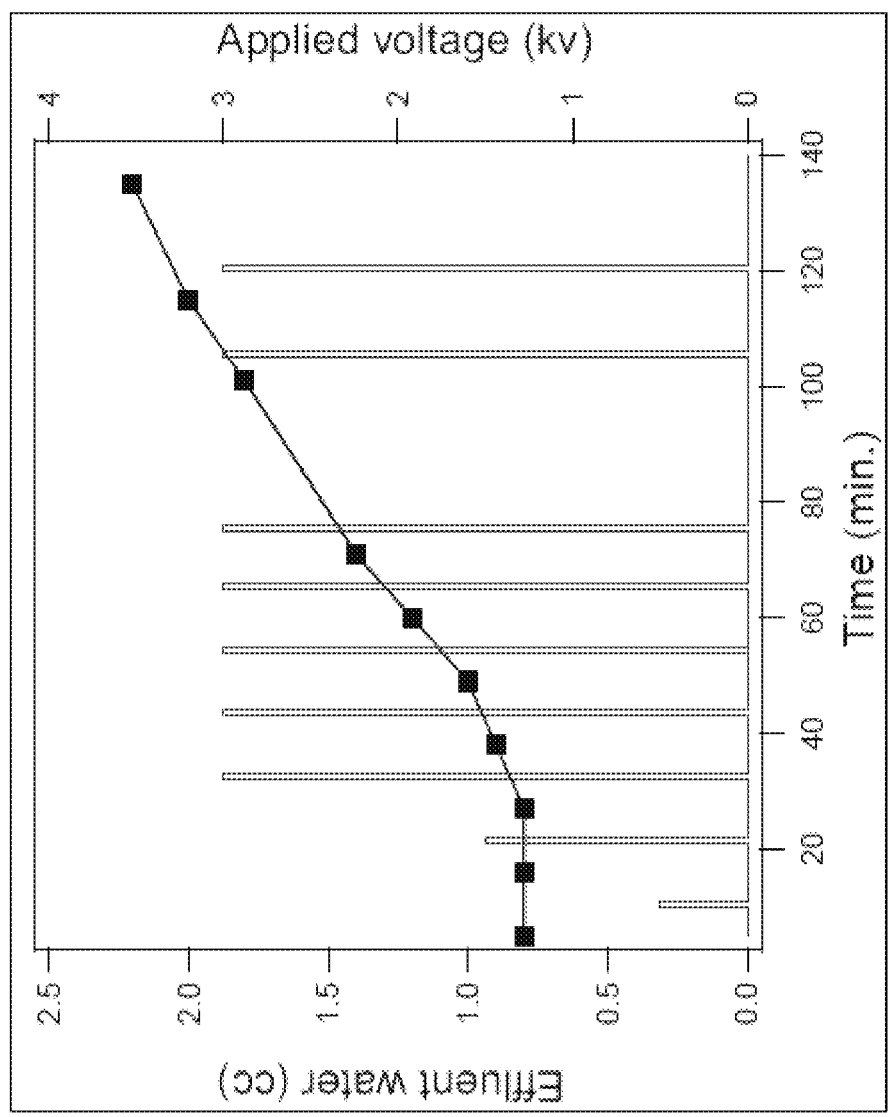

In the accompanying drawings:
FIG. 1 is a simplified schematic of a crude petroleum desalter unit, and
FIG. 2 is a schematic of the Rest Time apparatus and results of experiment reported in Example 1 below, and
FIGS. 3 and 4 are graphs showing the results of the experiments reported in Examples 2 and 3 below.

DETAILED DESCRIPTION

Petroleum Crude Desalting

Desalting is one of the first steps in crude refining. It is done to remove salts and particulates to reduce corrosion, fouling and catalyst poisoning. In a typical desalting process, fresh water (also referred to as wash water) is mixed with oil to produce a water-in-oil emulsion, which in turn extracts salt, brine and some particulates from the oil. The salty emulsion is then sent to a desalter unit where the application of an electric field forces water droplets to coalesce. Large electrocoalesced water droplets settle under gravity and penetrate through the oil/bulk-resolved-water interface to immerse into the resolved bulk water phase at the bottom of the desalter. The desalted oil and the resolved bulk water are then removed at the top and the bottom of a desalter, respectively.

The wash water used to treat the crude oil may be derived from various sources and the water itself may be, for example, recycled refinery water, recirculated wastewater, clarified water, purified wastewater, sour water stripper bottoms, overhead condensate, boiler feed water, clarified river water or from other water sources or combinations of water sources. Salts in water are measured in parts per thousand by weight (ppt) and could range from fresh water (<0.5 ppt), brackish water (0.5-30 ppt), saline water (30-50 ppt) to brine (over 50 ppt). Although deionized water may be used to favor exchange of salt from the crude into the aqueous solution, de-ionized water is not normally required to desalt crude oil feedstocks although it may be mixed with recirculated water from the desalter to achieve a specific ionic content in either the water before emulsification or to achieve a specific ionic strength in the final emulsified product. Wash water rates may be between approximately 5% and approximately 7% by volume of the total crude charge, but may be higher or lower dependent upon the crude oil source and quality. Frequently, a variety of water sources are mixed as determined by cost requirements, supply, salt content of the water, salt content of the crude, and other factors specific to the desalting conditions such as the size of the separator and the degree of desalting required.

Challenged crudes (i.e. crude with a high amount of particulates and/or natural emulsifiers) have been shown to produce a substantial amount of stable emulsion layers (a.k.a. rag layer), accumulating above the interface between the oil and resolved bulk water. The existence of a rag layer is mostly due to the inability of electrocoalesced droplets to break the oil/bulk-resolved-water interface.

The rag layer in the desalter typically contains a high concentration of oil, residual water, suspended solids and salts which, in a typical example, might be approximately 70% v/v water, 30% v/v oil, with 5000-8000 pounds per thousand barrels (PTB) (about 14 to 23 g/l.) solids, and 200-400 PTB (about 570 to 1100 mg/l.) salts. The aqueous phase contains salts from the crude oil, Crudes with high solids contents present a particularly intractable problem since the presence of the solids, often with particle sizes under 5 microns, may act to stabilize the emulsion and the oil/bulk-resolved-water interface, leading to a progressive increase in the depth of the rag layer. The present invention is especially useful in its application to challenged crudes containing high levels of solids and it may also be applied to benefit the desalting of high asphaltene content crudes which also tend to stabilize the emulsion layer and the oil/bulk-resolved-water interface in a desalter.

The conventional mitigation strategies carried out by enhancing the electrocoalescence in the desalter by, for example, the upstream addition of chemical demulsifiers tend to be less than totally effective in reducing the stability of the oil/bulk-resolved-water interface. This is likely due to the inability of the additive to fully reach the oil/bulk-resolved-water interface at the beginning of the desalting operation.

Thinning of the oil film between electrocoalesced water droplets and the resolved bulk water phase is mainly due to the gravitational force. A slow rate of film thinning reduces the ability of electrocoalesced water droplets to immerse into the resolved bulk water phase, causing the growth of a rag layer. The rate of film thinning strongly depends on the particulates and the chemistry of the oil at that interface and it may depend on physical parameters different from those of the electrocoalescence mechanism. The mechanism of emulsion stability within the electrodes, therefore, may not be the same as that of the stability of the oil/bulk-resolved-water interface. This in turn demands the different additive treatment for the oil/bulk-resolved-water interface which is provided in the present desalting process. The objective of the present invention is that the desalting should be carried out in the presence of the alkaline compound so as to promote dehydration of the emulsion and, accordingly, separation of the water from the emulsion layer.

FIG. 1 shows a much simplified schematic of a crude petroleum desalter unit utilizing the option of direct injection of a solution of the alkaline compound into the emulsion layer. The incoming crude oil feed to be desalted enters by way of line 1 and is mixed with fresh wash water feed from line 2 in mixing valve 3 to emulsify the water into the oil before the mixture is introduced into the desalter vessel 5. Under the high voltage electric field induced by means of electrode grids 4, the separation of the oil phase 6 and the water phase 8 takes place with the emulsion phase (rag layer) 7 forming at the interface between the oil and water phases. An aqueous solution of a selected alkaline compound such as sodium carbonate is injected directly into the water phase by way of line 9 and valve 10, Desalted oil is withdrawn from an outlet in the upper portion of the vessel and passes to refinery processing in line 12; salty water (brine) containing salts washed out of the crude is withdrawn from an outlet at the bottom of the vessel through line 13 and sent to waste water recovery.

The alkalinity of the water phase is preferably adjusted by the use of a metal compound with an alkaline pH, preferably at least pH 8 or higher, e.g. ph 9 or pH 10 although pH values above about 11 are preferably avoided in order to avoid the production of emulsifying salts from acid components in the crude. Suitable compounds with an alkaline pH include alkaline metal carbonates with preference given to sodium carbonate and alkali metal hydroxides such as sodium hydroxide. It has been found that effective destabilization of the emulsion layer requires not a high pH (e.g. 9-11) but also a sufficient cation concentration (Na+, K+, etc.). Sodium hydroxide (NaOH) for example, results in an adequate pH in relatively small amounts as compared to less basic salts but not enough Na+ cation for optimal destabilization of the emulsion; for this reason, it is desirable to add an additional source of cations to the wash water until an optimal effect is achieved. With sodium hydroxide a salt concentration of 0.05% NaCl to 10% NaCl with the best value seen at 0.2 or 0.3% has been found to be effective.

The amount of the alkaline additive is suitably at least 0.02 wt. pct and usually not more than 1 wt. pct will not be required, depending on the alkalinity of the selected compound. As shown below, amounts as small as 0.1 wt. pct, may be successful in effecting a significant reduction in the time taken for the emulsion to break down.

To accommodate growth and movement of the emulsion layer in the vessel, the inlet line for the solution of the alkaline compound may be provided with a manifold with inlet ports at different vertically spaced levels permitting the alkaline compound to be injected into the water layer at one Cr more of the ports as required. The ports may be provided with manually or, more preferably, automatic, operated valves to control the injection of the demulsifier. The solution of the alkaline compound may be added in the region of the oil/water interface, for example, within 10 or 20 cm of the interface.

The use of the present alkaline compound in the desalter water is without prejudice to the use of the demulsifiers commonly used in the processing of crude oil. Among the demulsifiers which may be used are those typically based on the following chemistries: polyethyleneimines, polyamines, polyols, ethoxylated alcohol sulfates, long chain alcohol ethoxylates, long chain alkyl sulfate salts, e.g. sodium salts of lauryl sulfates, epoxies, di-epoxies (which may be ethoxylated and/or propoxylated). A useful class of polyamines comprises the succinated polyamines prepared by the succination of polyamines/polyamine/imines with a long chain alkyl substituted maleic anhydride.

Example 1

Rest Time Measurement of Crude without Sodium Carbonate

The Rest Time method was used to measure the stability of the water/oil interface and its effect on preventing water droplets to immerse into the bottom water phase. In this measurement 85 mL of crude is left on 220 mL deionized water in a cylindrical glass container with internal diameter of 7.7 cm. After 30 minutes several droplets of water, which was dyed with food coloring, are dropped on the oil surface. When the droplets reach the interface between water and oil they rest at that interface before immersing into the water phase. The "Rest Time" is the time measured with the aid of a video camera, a water droplet rests at the water/oil interface before entering and immersing into the water phase.

The average rest time when no sodium carbonate was used in effluent water was measured to be 671 minutes; the simplified Rest Time experimental setup and results are shown in FIG. 2.

Example 2

Rest Time Measurement of Crude with Sodium Carbonate in Water

The Rest Time value when 0.1% sodium carbonate was added to the water phase below the oil phase was measured at 66 minutes. Examples 1 and 2 therefore demonstrate that when sodium carbonate was added to the water phase the oil/water interface was weakened and the water droplets were able to penetrate through the water/oil interface at much shorter time.

Example 3

Electrostatic Dehydration and Precipitation in the Absence of Sodium Carbonate

Aliqots of water and crude oil were heated to 85° C. Preheated water (4 mL) was added to 90 mL. of preheated crude oil and blended for 10 seconds at half full power using a Waring™ blender to generate a water-in-oil emulsion. The emulsion (74.2 mL) of was then poured in a transparent vessel of an Electrostatic Dehydration and Precipitation Tester (EDPT) (from Inter AV inc.) which was preheated to 90° C. and contained 0.8 mL water. The vessel's cap was tightened and temperature was then increased to 120° C.

Voltages of 500, 1500 and 3000 volts for duration of one minute were applied respectively at 10, 21, 32 minutes after the EDPT reached 120° C. A voltage of 3000 volts for duration of one minute was applied at 43, 54, 65, 75, 105 and 120 minutes after the EDPT reached 120° C. The amount of the effluent water at the bottom of the vessel was measured at 5, 16, 27, 38, 49, 60, 71, 101, 115 and 135 minutes after the EDPT reached 120° C. This includes both the water separated from the crude and the initial 0.8 mL added water.

The variations in the amount of the effluent water with time and voltage are shown in FIG. 3. The maximum amount of water observed was 0.85 mL. This indicates that in the absence of a chemical demulsifier only 0.05 mL water was separated from the oil and reached to the bottom of the vessel.

Example 4

Electrostatic Dehydration and Precipitation in the Presence of Sodium Carbonate

Aliquots of water and crude oil were heated to 85° C. Preheated water (4 mL) was added to 90 mL of preheated crude oil and blended for 10 seconds at half full power using a Waring blender to generate a water-in-oil emulsion. The emulsion 74.2 (mL) was then poured in a transparent vessel of an Electrostatic Dehydration and Precipitation Tester (EDPT) (from Inter AV Inc.) which was preheated to 90° C. and contained 0.8 mg sodium carbonate in 0.8 mL water. The vessel's cap was tightened and temperature was then increased to 120° C.

Voltages of 500, 1500 and 3000 volts for duration of one minute were applied at 10, 21, 32 minutes respectively after the EDPT reached 120° C. A voltage of 3000 volts for duration of one minute was applied at 43, 54, 65, 75, 105 and 120 minutes after the EDPT reached 120° C. The amount of the effluent water at the bottom of the vessel was measured at 5, 16, 27, 38, 49, 60, 71, 101, 115 and 135 minutes after the EDPT reached 120° C. This includes both the water separated from the crude and the initial 0.8 mL added water.

The variations in the amount of the effluent water with time and voltage are shown in FIG. 4. The maximum amount of water observed was 2.2 mL. This indicates that in the absence of an alkaline additive, only 1.4 mL water was separated from the oil and reached to the bottom of the vessel.

Example 3 and 4 teach that addition of sodium carbonate increases water dehydration significantly and in this case by factor of 28.

The invention claimed is:

1. A petroleum desalting process which comprises:
    mixing a crude oil to be desalted with water to form an oil/water emulsion,
    passing the emulsified mixture of oil and water to a desalter vessel through an emulsified mixture supply line,
    subjecting the emulsified mixture of oil and water in the desalter vessel to an electric field to cause separation of the emulsified oil/water mixture into a settled, denser water layer containing dissolved salts from the oil and a supernatant oil layer by coalescence of water droplets in the emulsified oil/water mixture with formation of a stabilized emulsion layer formed from the oil and the water and emulsion-stabilizing solids above the interface between the settled water layer and the supernatant oil layer,
    adding an alkaline metal compound directly and only into the settled water layer within the vessel through an alkaline metal compound supply line, in which the alkaline metal compound is added to the settled water layer within a vertical distance of not more than 20 cm from the interface between the oil and water layers, to destabilize the stabilized emulsion layer, wherein the alkaline metal compound supply line is separate from the emulsified mixture supply line, and
    separately removing the separated oil and water layers.

2. A desalting process according to claim 1 in which the amount of alkaline metal compound is from 0.02 to 1 wt. pct. of the water.

3. A desalting process according to claim 1 in which the alkaline metal compound is added to the settled water layer within a vertical distance of not more than 10 cm from the interface between the oil and water layers.

4. A desalting process according to claim 1 further comprising adding an additional quantity of alkaline metal compound to the crude at a location upstream of the desalter vessel.

5. A desalting process according to claim 1 in which the alkaline metal compound comprises sodium carbonate.

6. A desalting process according to claim 1 in which the alkaline metal compound comprises sodium carbonate present in the water layer at a concentration of from 0.1 to 1.0 wt. pct.

7. A desalting process according to claim 1 in which the alkaline metal compound comprises sodium hydroxide in combination with sodium chloride.

8. A desalting process according to claim 1 in which the water layer has a pH from 8 to 10.

9. A desalting process according to claim 1 in which the alkaline metal compound comprises sodium hydroxide in combination with 0.2 to 0.3 wt. pct. sodium chloride.

* * * * *